（12) United States Patent
Fan et al.

(10) Patent No.: US 12,101,169 B2
(45) Date of Patent: Sep. 24, 2024

(54) CARRIER ACQUISITION IN SATELLITE COMMUNICATIONS

(71) Applicant: Hughes Network Systems, LLC, Germantown, MD (US)

(72) Inventors: Zengquan Fan, Germantown, MD (US); Kish Jadhav, Germantown, MD (US); David Whitefield, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 274 days.

(21) Appl. No.: 17/537,860

(22) Filed: Nov. 30, 2021

(65) Prior Publication Data

US 2023/0170982 A1    Jun. 1, 2023

(51) Int. Cl.
| | |
|---|---|
| H04B 7/185 | (2006.01) |
| H04W 72/04 | (2023.01) |
| H04W 72/0453 | (2023.01) |
| G06N 20/00 | (2019.01) |

(52) U.S. Cl.
CPC .... *H04B 7/18513* (2013.01); *H04W 72/0453* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 10,237,770 B2 * | 3/2019 | Kleinbeck | H04B 17/318 |
| 11,832,110 B2 * | 11/2023 | Montalvo | G06N 20/10 |
| 2015/0093995 A1 * | 4/2015 | Gilbert | H04B 7/18517 455/63.1 |
| 2017/0180038 A1 | 6/2017 | Oza | |
| 2017/0201404 A1 | 7/2017 | Su | |
| 2019/0217974 A1 | 7/2019 | Aymes | |
| 2020/0153535 A1 * | 5/2020 | Jayaweera Kankanamge | G06V 10/82 |
| 2020/0351795 A1 | 11/2020 | Regunathan | |
| 2021/0058293 A1 | 2/2021 | Whitefield | |
| 2022/0124722 A1 | 4/2022 | Xu | |

(Continued)

FOREIGN PATENT DOCUMENTS

| | | |
|---|---|---|
| WO | 2017218855 A1 | 12/2017 |
| WO | 2019133353 A1 | 7/2019 |

OTHER PUBLICATIONS

International Search Report and Written Opinion for PCT/US2022/044357 mailed Dec. 20, 2022 (9 pages).

(Continued)

*Primary Examiner* — Pablo N Tran
(74) *Attorney, Agent, or Firm* — Bejin Bieneman PLC

(57) ABSTRACT

A computer comprises a processor and a memory. The memory stores instructions executable by the processor to input a frequency spectrum distribution to a machine learning program to obtain carrier data as output from the machine learning program satellite communication. The machine learning program is trained with a plurality of frequency spectrum distributions of a wireless satellite communication signal and metadata specifying one or more satellite communication carriers for respective ones of the frequency spectrum distributions, wherein the metadata for each satellite communication carrier includes a respective center frequency and a respective symbol rate.

20 Claims, 6 Drawing Sheets

(56) References Cited

U.S. PATENT DOCUMENTS

2023/0074790 A1    3/2023   Garcia Gener
2023/0141890 A1    5/2023   Furman

OTHER PUBLICATIONS

International Search Report and Written Opinion for PCT/US2022/044358 mailed Jan. 4, 2023 (10 pages).
Non-Final Office Action mailed Nov. 6, 2023 for related U.S. Appl. No. 17/537,879 (17 pages).
USPTO Notice of Allowance mailed Mar. 1, 2024 in related U.S. Appl. No. 17/537,879 (47 pages).

* cited by examiner

CARRIER ACQUISITION IN SATELLITE COMMUNICATIONS

BACKGROUND

Satellite communications can provide wireless communications over a large area of the Earth's surface, e.g., for Internet access, enterprise intranet connectivity, TV (television) broadcasting services, etc. Respective satellites' coverage of the Earth's surface may overlap. A satellite beam may communicate with satellite terminals via multiple carriers. A satellite terminal may select a carrier from a satellite beam with one or more beams covering a location of the satellite terminal based on data specifying various carriers of a satellite beam.

DETAILED DESCRIPTION

Introduction

Figure 1:
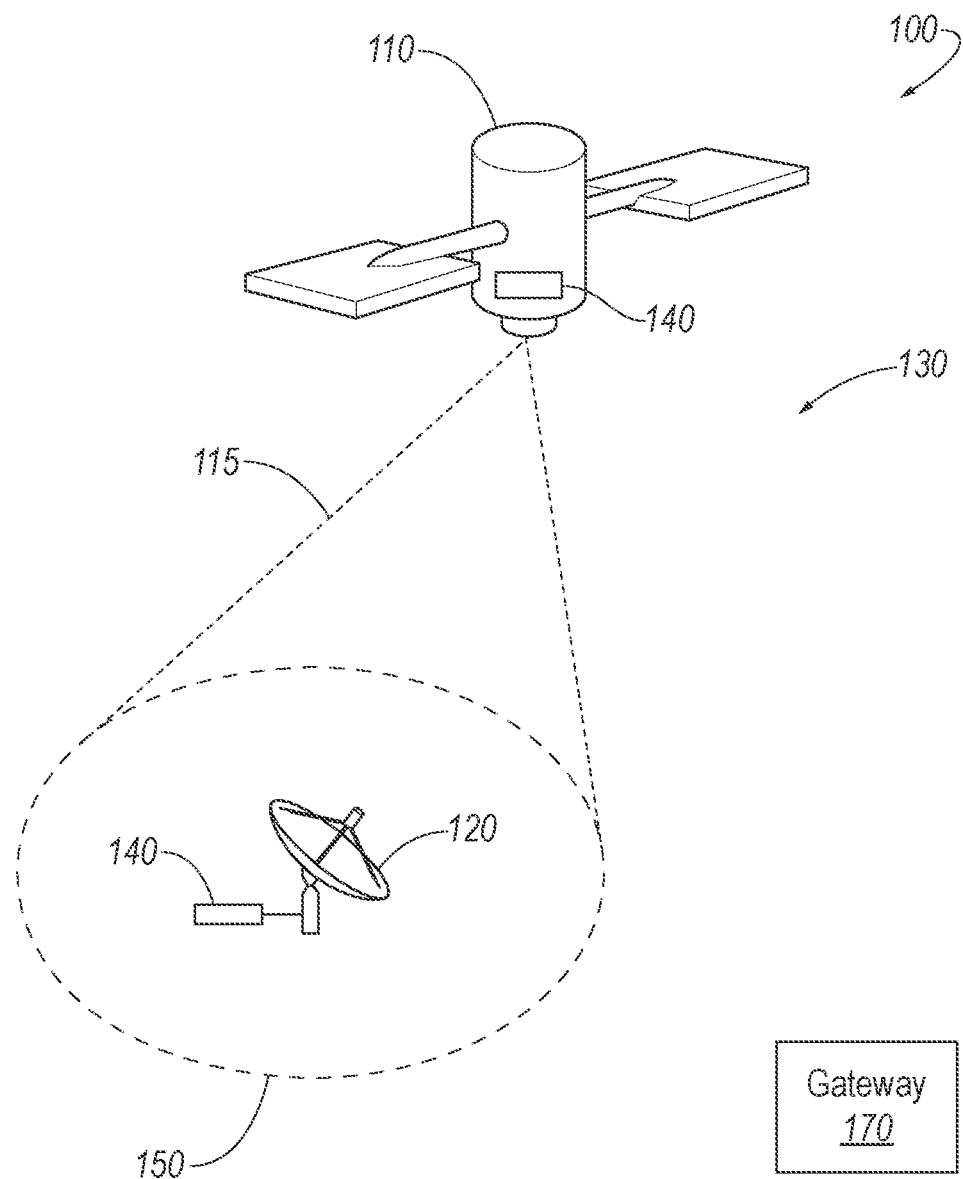
FIG. 1 shows an example satellite network.

Disclosed herein is a computer comprising a processor and a memory. The memory stores instructions executable by the processor to input a frequency spectrum distribution to a machine learning program to obtain carrier data as output from the machine learning program satellite communication. The machine learning program is trained with a plurality of frequency spectrum distributions of a wireless satellite communication signal and metadata specifying one or more satellite communication carriers for respective ones of the frequency spectrum distributions, wherein the metadata for each satellite communication carrier includes a respective center frequency and a respective symbol rate.

Respective frequency spectrum distributions may be a result of a frequency spectrum analysis of the received wireless satellite communication.

The frequency spectrum analysis may include performing a Fourier Transform.

The instructions may further include instructions to determine training data for the machine learning program based on user input specifying one or more satellite carriers for each of the one or more frequency spectrum distributions.

The one or more frequency spectrum distributions may be results of simulation or measurement of satellite signal.

The carrier data may include a symbol rate and a center frequency for each carrier.

The carrier data may further include a confidence measure for each identified carrier.

The instructions may further include instructions to determine that the machine learning program is trained upon determining that a detection accuracy of the machine learning program exceeds a threshold.

The machine learning program may be a convolutional neural network including a dense layer and a flatten layer.

Exemplary System Elements

A satellite terminal may select a carrier from a satellite beam with one or more beams covering a location of the satellite terminal based on data specifying various carriers of a satellite beam. A computer of the satellite terminal then stores data specifying carriers of beams covering the terminal location. The terminal's stored data may need to be updated, e.g., because of a change, addition, or removal of a carrier. Advantageous techniques are described herein to identify carriers of a satellite beam in a satellite terminal, and to select a carrier for operation of the satellite terminal based on the identified carriers. A computer, e.g., in a terminal, can be programmed to input a frequency spectrum to a machine learning program to obtain satellite communication carrier data as output from the machine learning program. The machine learning program is trained with multiple frequency spectrum distributions of a wireless satellite communication signal, and with metadata specifying one or more satellite communication carriers for respective ones of the frequency spectrum distributions. The metadata for respective satellite communication carriers includes a center frequency and a symbol rate of the carrier.

Additionally or alternatively, the satellite terminal can be programmed to determine a frequency spectrum distribution for a wireless communication signal received via an antenna from a remote computer, and to input the determined frequency spectrum distribution of the received wireless communication signal to a machine learning program trained to identify satellite communication carriers in a frequency spectrum distribution. The satellite terminal can be further programmed to receive a list of one or more satellite communication carriers from the trained machine learning program, and to lock the satellite terminal to a selected one of the carriers of a satellite gateway, the selected carrier being included in the list of one or more satellite communication carriers.

With reference to FIG. 1, a satellite network 100 may include one or more satellites 110 providing satellite communication to terminals 120 located in a coverage area 130 of the satellite communication network 100. A coverage area 130 of a satellite communication network 100 includes a geographical area on the surface of Earth. A coverage area 130 of a satellite communication network 100 may include footprints 150 of one or more beams 115 of one or more satellites 110 included in the satellite communication network 100. Locations on the surface of Earth, e.g., a location of a satellite terminal 120, may be specified based on a location coordinate system, e.g., a planar coordinate system including longitudinal and latitudinal coordinates. Additionally or alternatively, a location on the surface of Earth may be specified based on a celestial coordinate system including an azimuth and an elevation (or altitude).

A satellite 110 may include a computer 140 and an antenna communicating with terminals 120 via a satellite communication link. In the present context, a satellite link (or satellite communication link) includes an uplink and/or a downlink. An uplink includes communication from a terminal 120 or a satellite gateway 170 to a satellite 110. A downlink includes communication from the satellite 110 to a gateway 170 or a terminal 120.

A satellite 110 antenna may communicate via one or more satellite beams 115 having respective footprints 150. In the present context, a footprint 150 of a satellite beam 115 is a geographical area on the surface of Earth, in which a terminal 120 may communicate with the satellite 110 via the respective beam 115. A satellite 110 beam 115 having a footprint 150 is a satellite 110 signal that is concentrated in power, sent by a high-gain antenna, and that therefore typically covers only a limited geographic area on Earth. A satellite 110 may have any number (one or more) of beams 115 that cover different parts of satellite network coverage area 130. Satellite 110 beams 115 may overlap. A footprint 150, i.e., including its dimensions and shape, is determined by a satellite 110 distance from the Earth and physical characteristics of the satellite 110 antenna such as antenna radiation pattern, etc. A terminal 120 in a footprint 150 may receive data from the satellite 110 via a downlink or send data to the satellite 110 via an uplink. A satellite 110 may provide coverage for multiple terminals 120, e.g., in multiple geographical regions within the footprint 150. A footprint 150 of a beam 115 may have a circular shape or a non-circular shape, e.g., an ellipse, a polygon, etc. A shape of a footprint 150 is determined based on physical characteristics of satellite 110 antenna, e.g., radiation pattern, a frequency of communication, a distance of the satellite 110 from the Earth, etc.

A footprint 150 shape and/or dimensions may be changed by adjusting location coordinates of the perimeter of the footprint 150, whereas a footprint 150 shape and/or dimensions can be changed by changing physical characteristics such as a satellite 110 antenna radiation pattern, communication frequency, etc. In other words, by defining footprints 150 using stored location coordinates of a perimeter of the footprint 150, the footprints 150 can be adjusted in shape, dimensions, and/or location by changing the stored data.

A gateway 170 computer 140, a satellite 110 computer 140, or a terminal 120 computer 140, is a computing device including a processor and memory. Computer memory can be implemented via circuits, chips or other electronic components and can include one or more of read-only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store instructions executable by the processor and other data. The processor is implemented via circuits, chips, or other electronic components and may include one or more microcontrollers, one or more field-programmable gate arrays (FPGAs), one or more application-specific integrated circuits (ASICs), one or more digital signal processors (DSPs), one or more customer-specific integrated circuits, etc. A processor in a computer 140 included in a terminal 120, a satellite 110, and/or gateway 170 may be programmed to execute instructions stored in a computer memory to carry out the actions, as disclosed herein.

The terminals 120 (or satellite terminals 120), e.g., very small aperture terminals (VSAT), are computer-based communication devices implemented via circuits, chips, antennas, or other electronic components that can communicate with satellites 110 that are within communication range of the terminal 120. A terminal 120 can be stationary relative to a location on Earth or can be mobile, i.e., moving relative to a location on the Earth. In some instances, terminal 120 may provide an interface between a satellite 110 and other ground-based communication devices. For instance, terminal 120 may receive communications from a satellite 110 and transmit such communications via terrestrial communication channels (i.e., between ground-based devices).

A terminal 120 includes one or more computers 140. A terminal 120 may include a modulator and a demodulator to facilitate communications with satellites 110. Moreover, a terminal 120 may include an encoder to encode outgoing data and/or a decoder to decode received data. A terminal 120 may include or be communicatively connected to one or more antennas, which allow a terminal 120 to communicate with a satellite gateway 170 via one or more satellites 110 at a time. For example, a dish antenna may include a low-noise block downconverter (LNB) mounted on the dish, which may collect radio waves from the dish and convert the collected radio waves to a signal which is sent through a wired connection, e.g., a cable, to the terminal 120.

A terminal 120 communicates with a satellite 110 via a carrier (or channel). A satellite 110 beam 115 provides for communications via multiple carriers. Several terminals 120 can communicate via a carrier of one beam 115. In one example, a satellite 110 beam 115 may have 5 carriers. Satellite 110 beams 115 and their carriers may be individually addressable. Thus, a satellite 110 may send first data via a first carrier and send second data via a second carrier.

Figure 2:
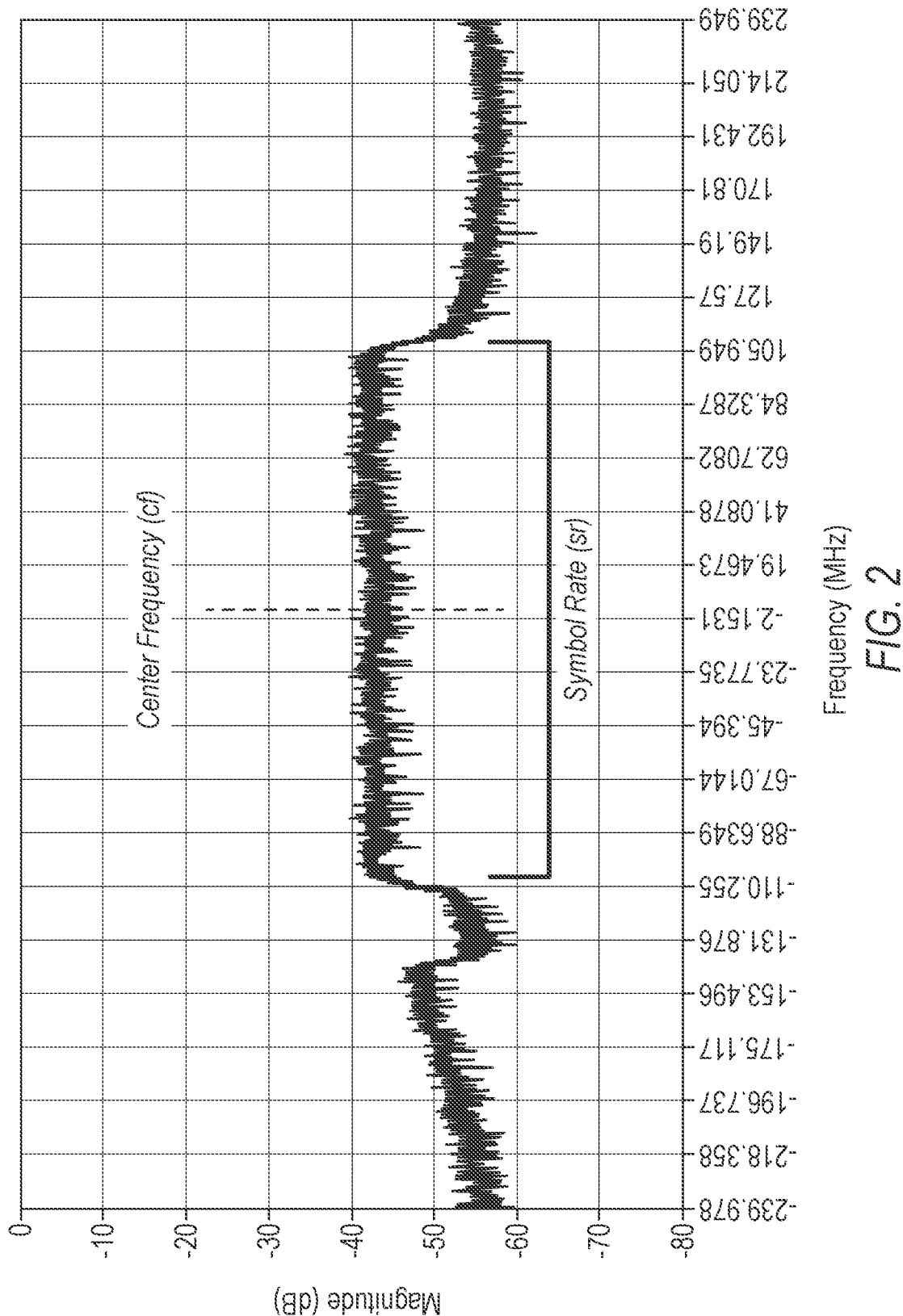
FIG. 2 illustrates a shape of an example carrier in a frequency spectrum.

FIG. 2 shows an example frequency spectrum distribution of radio signal received via a beam from a satellite 110 in a frequency domain. In the present context, a frequency spectrum distribution is a result of a frequency spectrum analysis, e.g., a Fourier Transform, of the received wireless satellite communication. A carrier can be specified in a frequency spectrum distribution by a symbol rate sr which is a range of the carrier and a center frequency cf of the carrier which is an offset from a center of the frequency spectrum. A terminal 120 may communicate with a satellite 110 by locking to one of the carriers included in a beam 115. In the present context, locking to a carrier means configuring a terminal 120 to communicate based on the respective center frequency cf and symbol rate sr of the carrier. In some examples, a terminal 120 may include a phased locked loop (PLL) circuit that is configured to communicate based on a specific carrier of the beam 115. To communicate via a carrier, the terminal 120 computer 140 may be programmed to actuate an electronic component, e.g., a PLL circuit, of the terminal 120 to establish a communication link with the satellite 110 based on the center frequency cf and symbol rate sr of the carrier.

Figure 3:
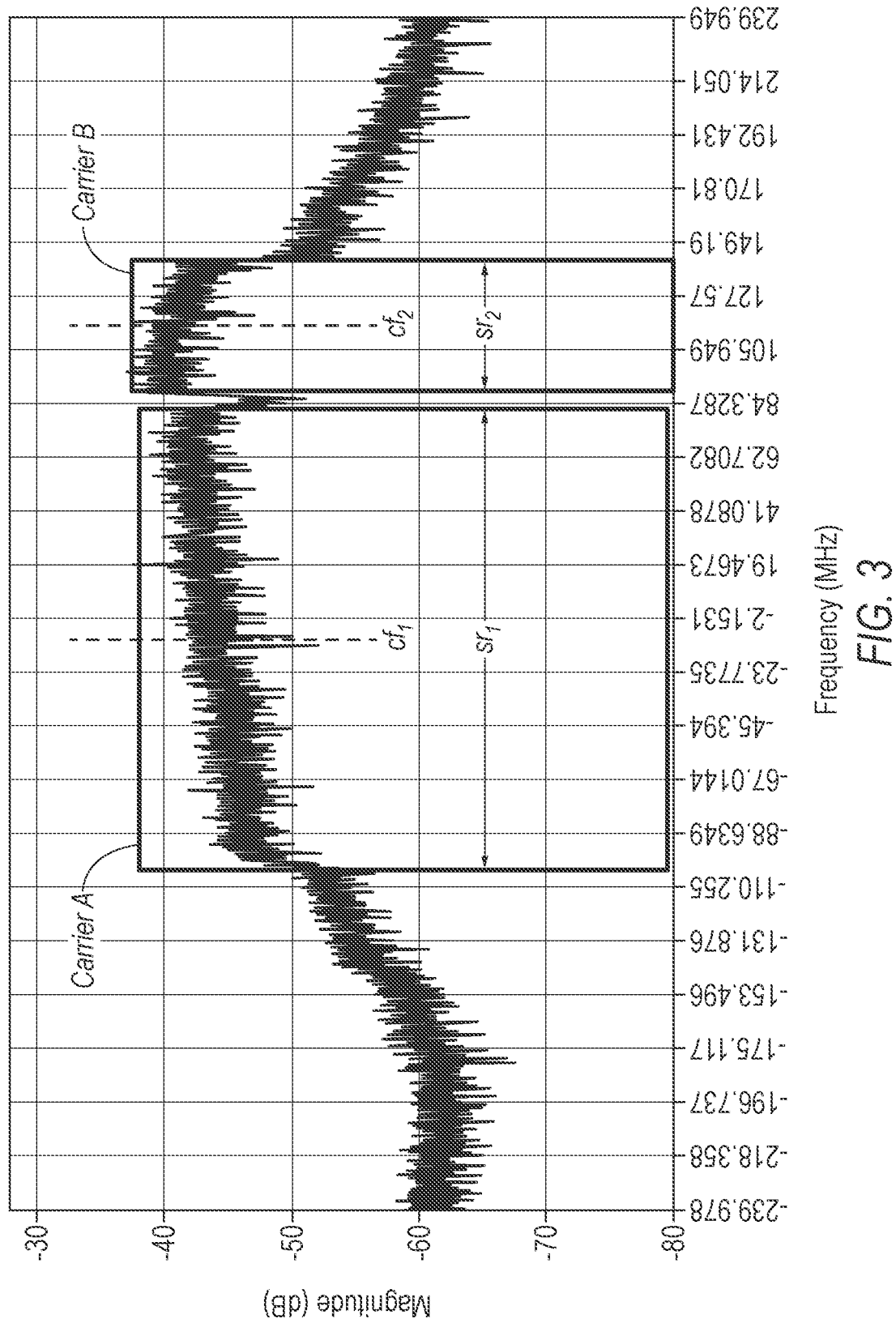
FIG. 3 illustrates multiple carriers in an example frequency spectrum distribution.

As shown in the example frequency spectrum distribution of FIG. 3, a beam 115 typically includes multiple carriers, e.g., carrier A and carrier B. For example, carrier A can be specified with a first center frequency $cf_1$ and a first symbol rate $sr_1$, and carrier B can be specified with a second center frequency $cf_2$ and a second symbol rate $sr_2$. The data specifying a carrier, e.g., a center frequency cf and a symbol rate sr, are referred to herein as carrier data.

A machine learning program such as a neural network (NN), SVM (Support Vector Machine), decision tree, naïve Bayes algorithm, ensemble methods, etc., can be implemented in software and/or hardware.

A neural network is a computer system that is inspired by biological neural networks. For example, a convolutional neural network (CNN), learns to perform tasks by receiving sample inputs, i.e., sets of data such as images, audio data or, as in present examples, frequency spectrum distributions, etc., without being programmed with any task-specific rules. A neural network can be a software program that can be loaded in a memory and executed by a processor included in, e.g., a computer 140. The neural network can include n input nodes, each accepting a set of inputs i (i.e., each set of inputs i can include one or more inputs x). The neural network can include m output nodes (where m and n may be, but typically are not, a same number) that provide sets of outputs $o_1 \ldots o_m$. In the present context, the "sets of output" are sets of data for respective carriers that specify respective center frequencies cf and symbol rates sr for the carriers represented in the set. A neural network typically includes a plurality of layers, including a number of hidden layers, each layer including one or more nodes. The nodes are sometimes referred to as artificial neurons because they are designed to emulate biological, e.g., human, neurons. Additionally or alternatively, a neural network may have various architectures, layers, etc. such as are known.

In one example, a machine learning program, e.g., a CNN, can be trained to receive as input a frequency spectrum distribution such as shown in FIG. 3, and output satellite communication carrier data, e.g., center frequencies $cf_1$, $cf_2$, e.g., −10 MHz and 115 MHz, and symbol rates $sr_1$, $sr_2$, e.g., 180 Msps and 54 Msps, of carrier A and carrier B.

The machine learning program can be trained with multiple frequency spectrum distributions of a wireless satellite communication signal and metadata specifying one or more satellite communication carriers for respective ones of the frequency spectrum distributions.

The metadata for each satellite communication carrier includes a respective center frequency cf and a respective symbol rate sr. Table 1 below shows an example set of training data including the metadata, e.g., including a first and a second frequency spectrum distributions. The first frequency spectrum distribution includes carriers A and B with respective metadata. The second frequency spectrum distribution includes carriers C, D, E, and F with respective metadata. The training data for the machine learning program may be determined based on user input specifying one or more satellite carriers for each of the one or more frequency spectrum distributions. For example, a user may identify the carriers based on a visual representation of a frequency spectrum distribution such as shown in FIG. 3.

TABLE 1

| Frequency distribution identifier | Carrier | Center frequency | Symbol rate | Bandwidth Mbps |
|---|---|---|---|---|
| 1 | A | $cf_1$ | $sr_1$ | $bw_1$ |
| 1 | B | $cf_2$ | $sr_2$ | $bw_2$ |
| 2 | C | $cf_3$ | $sr_3$ | $bw_3$ |
| 2 | D | $cf_4$ | $sr_4$ | $bw_4$ |
| 2 | E | $cf_5$ | $sr_5$ | $bw_5$ |
| 2 | F | $cf_6$ | $sr_6$ | $bw_6$ |

Training a neural network may include adjustment of weights and bias of the network through backpropagation to reduce the prediction error or commonly known as the loss of the network's prediction. Back-propagation is a technique that returns output states from a CNN to the input to be compared to corresponding ground truth. In this example, during training the output carrier data can be backpropagated to be compared to the metadata included in the ground truth training data to determine a loss function. The loss function determines how accurately the CNN has processed the input data. A CNN can be executed a plurality of times on a set of ground truth data while varying parameters that control the processing of the CNN. Parameters that correspond to correct answers as confirmed by a loss function that compares the output states to the ground truth are saved as candidate parameters. Following the test runs, the candidate parameters that produce the most correct results are saved as the parameters that will be used to program the CNN during operation.

Figure 4:
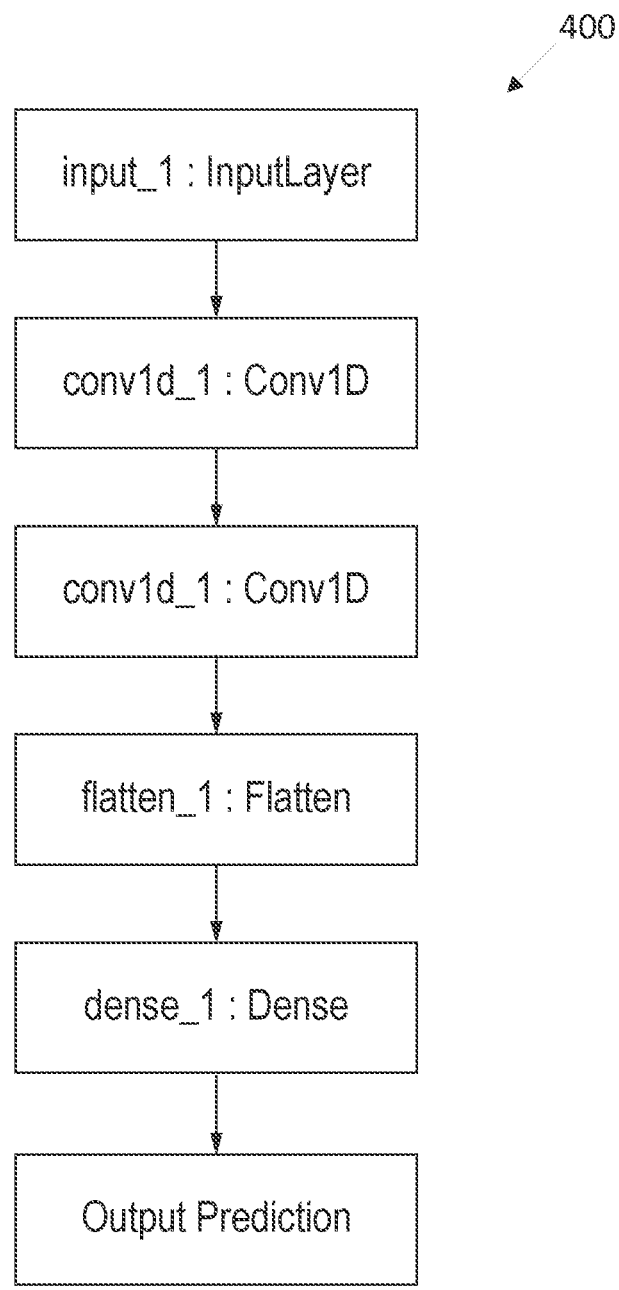
FIG. 4 is a block diagram of an example machine learning program for identifying carrier data in an input frequency spectrum distribution.

FIG. 4 shows an example block diagram 400 of a CNN trained to output carrier data based on an input frequency spectrum distribution. In this example, a multi-layer 1D (one-dimensional) CNN machine learning model is used to detect the symbol rate sr and center frequency cf of carrier(s) through pattern recognition on the frequency spectrum distribution of the carrier signal.

The training data may include real measured data and/or simulated frequency spectrum distributions including various actual satellite carriers. The training can be performed to reach a level of detection accuracy exceeding a specified threshold, e.g., 90%. Detection accuracy in the context of this document means a percentage of identifications of a carrier center frequency cf and symbol rate sr by the machine learning program that are correct, i.e., match within a specified error threshold, e.g., 5%, when compared to actual values of center frequency cf and symbol rate sr of the carrier.

The example machine learning program of FIG. 4 includes 3 layers, 2 1D (one dimensional) CNN layers, and a final dense layer. In a dense layer, a non-linear function, e.g., a rectified linear unit (RELU) function, is applied to a weighted sum of inputs. A flatten layer converts a multi-dimensional matrix input into a single dimension matrix. Based on performed lab tests, the multilayer example machine learning model of FIG. 4 could be trained to reach a 96% detection accuracy when tested against actual received satellite data. An output prediction blocks outputs the identified carriers. In some example, the output block may output a confidence measure for each identified carrier. A confidence measure may be in a range of 0 to 100% (percent). A higher confidence measure indicates a higher likelihood of accurate identification of the respective carrier.

Figure 5:
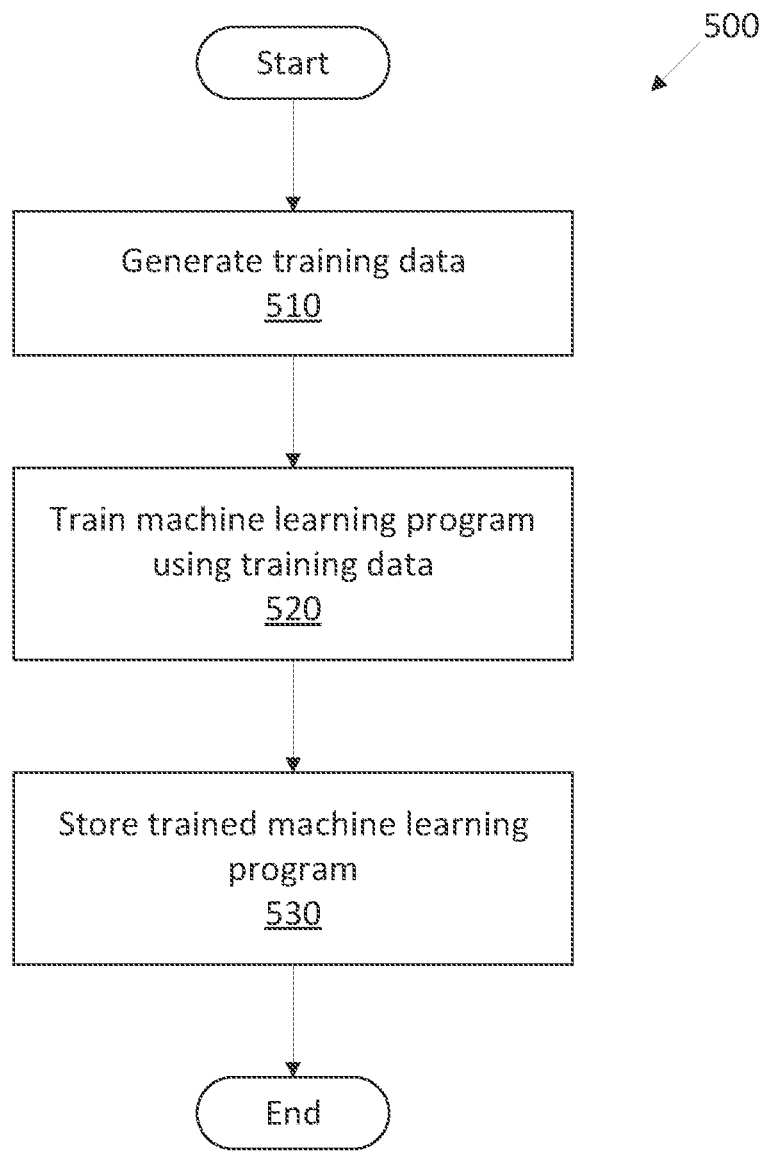
FIG. 5 is a flowchart of an example process for training the machine learning program of FIG. 4.

FIG. 5 shows an example flowchart of a process 500 for training the machine learning program to output carrier data. Any suitable computer may be programmed to execute blocks of the process 500.

The process 500 begins with generating training data. The computer may be programmed to receive user input identifying carrier data in multiple stored frequency spectrum distributions. For example, a user input may include numerical input, e.g., center frequency cf, symbol rate sr, etc., specifying one or more carriers in the received frequency spectrum distributions. For example, a user may provide input to identify the carriers in a display of an illustrated graph of the frequency spectrum distribution as shown in the example graph of FIG. 3. The lab computer may then store the training data including the frequency spectrum distributions and respective carrier data.

Next, in a block 520, the lab computer trains the machine learning program, e.g., a CNN, based on the generated training data. The lab computer may train a CNN by inputting the generated training data to the CNN and train the CNN, e.g., using backpropagation technique.

Next, in a block 530, the lab computer may store the trained machine learning program, e.g., weights and biases of the trained CNN, in a computer memory. The stored data specifying the machine learning program may be transmitted to satellite terminals 120 and stored in a memory of the terminal 120 computer 140. Following the block 530, the process 500 ends or alternatively returns to the block 510, although not shown in FIG. 5.

Figure 6:
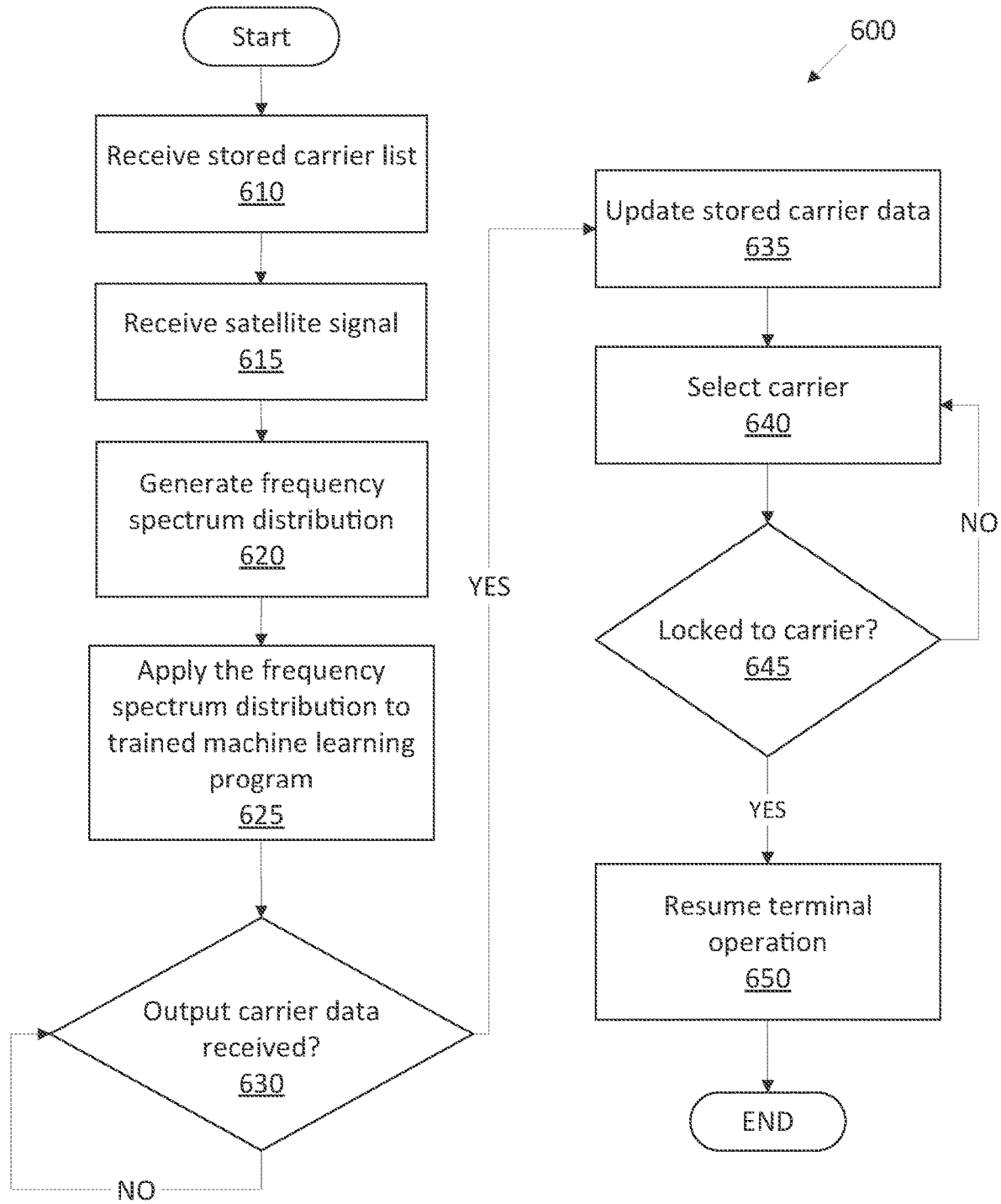
FIG. 6 is a flowchart of an example process for operating a satellite terminal.

As discussed above, a terminal 120 may communicate with a satellite 110 by locking to one of the carriers included in a beam 115. The terminal 120 computer 140 may store data specifying carriers of the satellite 110 beam 115, however, carrier data of a beam 115 may change, e.g., new carriers may be added, existing carriers may be removed, etc. FIG. 6 is a flowchart of an example process 600 for operating a satellite terminal 120. A satellite terminal 120 computer 140 may be programmed to execute blocks of the process 600.

The process 600 begins in a block 610, in which the computer 140 receives stored carrier list. In one example, the computer 140 may store a list of carriers in a computer 140 memory and may receive the stored list from the computer 140 memory.

Next, in a block 615, the computer 140 receives a satellite signal from a gateway 170, typically via an antenna electrically connected to the terminal 120. In one example, a receiving circuit of a terminal, e.g., an amplifier and/or decoder circuit, receives the electrical signal for further processing.

Next, in a block 620, the computer 140 generates a frequency spectrum distribution of the received satellite signal. Additionally or alternatively, an electronic circuit such a digital signal processing unit may be configured to determine the frequency spectrum distribution of the received signal, e.g., by computing a Fourier transform or a Fast Fourier Transform (FFT) of the received signal.

Next, in a block 625, the computer 140 applies the generated frequency spectrum distribution to trained machine learning program, e.g., the trained CNN as discussed with respect to FIGS. 4-5.

Next, in a block 630, the computer 140 determines whether output carrier data is received from the trained machine learning program. If the computer 140 receives the output carrier data from the trained machine learning program, then the process 600 proceeds to a block 635; otherwise the process 600 returns to the decision block 630.

In the block 635, the computer 140 updates stored carrier data. The computer 140 may be programmed to compare stored carrier data with the output carrier data received from the trained machine learning program. The computer 140 may be programmed to update the stored list by (i) removing a carrier from the list that is not included in the output carrier data, and (ii) adding a carrier to the list that is not present in the stored list but available in the output carrier data of the machine learning program.

Next, in a block 640, the computer 140 selects a carrier from the updated carrier list. In one example, the computer 140 may be programmed to select a first carrier from the list, e.g., a first identifier in the list. In another example, the computer 140 may be programmed to select a carrier based on further criteria such as an available bandwidth of each carrier or based on a load balancing scheme. The computer 140 may be programmed to select a carrier further based on determining whether a previous attempt to lock to the respective carrier has been successful. The computer 140 may determine that a previous attempt was unsuccessful if the block 640 is reached from the decision block 645. For example, if an attempt to lock to a first carrier was unsuccessful, the computer 140 may select a second carrier from the updated list. An attempt to lock occurs when the computer 140 actuates, e.g., a PLL circuit, of the terminal 120 to lock to a selected carrier. An attempt is successful if the terminal 120 can establish a communication link via the selected carrier with the satellite 110. An attempt is unsuccessful is the terminal 120 can not establish a communication link via the selected carrier and/or at least some other criteria is not fulfilled, e.g., a bandwidth of the established link is less than a threshold, etc. Additionally or alternatively, the computer 140 may be programmed to select a carrier based on a confidence measure of the respective carrier. As discussed above, the trained machine learning program may output a confidence measure for each of the identified carriers. The computer 140 may be programed to select a carrier upon determining that a respective confidence measure exceeds a threshold, e.g., 90%.

Next, in a decision block 645, the computer 140 determines whether the terminal 120 has been locked to the selected carrier. The computer 140 may be programmed to actuate an electronic component of the terminal 120, e.g., a PLL circuit, to lock the carrier to the selected carrier and determine that the locking was unsuccessful if the locking has not succeeded within a specified time window, e.g., 1 second. If the computer 140 determines that the terminal 120 is locked to the selected carrier, then the process 600 proceeds to a block 650; otherwise the process 600 returns to the block 640.

In the block 650, the computer 140 resumes operation of the terminal 120 by establishing a downlink and/or uplink to the satellite 110 and starting communication via the established satellite link(s). Following the block 650, the process 600 ends, or alternatively returns to the block 610, although not shown in FIG. 6.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance. Examples of computing devices include, without limitation, network devices such as a gateway or terminal, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer, comprising a processor and a memory, the memory storing instructions executable by the processor to:
   input a frequency spectrum distribution to a machine learning program to obtain carrier data, including a symbol rate and a center frequency, and output the obtained carrier data from the machine learning program,
   wherein the machine learning program is trained with a plurality of frequency spectrum distributions of a wireless satellite communication signal and metadata specifying one or more satellite communication carriers for respective ones of the frequency spectrum distributions, wherein the metadata for each satellite communication carrier includes a respective center frequency and a respective symbol rate.

2. The computer of claim 1, wherein respective frequency spectrum distributions are a result of a frequency spectrum analysis of the received wireless satellite communication.

3. The computer of claim 2, wherein the frequency spectrum analysis includes performing a Fourier Transform.

4. The computer of claim 1, wherein the instructions further include instructions to determine training data for the machine learning program based on user input specifying one or more satellite carriers for each of the one or more frequency spectrum distributions.

5. The computer of claim 4, wherein the one or more frequency spectrum distributions are results of simulation or measurement of satellite signal.

6. The computer of claim 1, wherein the carrier data further includes a confidence measure for each identified carrier.

7. The computer of claim 1, wherein the instructions further include instructions to determine that the machine learning program is trained upon determining that a detection accuracy of the machine learning program exceeds a threshold.

8. The computer of claim 1, wherein the machine learning program is a convolutional neural network including a dense layer and a flatten layer.

9. The computer of claim 1, wherein the instructions include further instructions to update a stored carrier list with carrier data output from the machine learning system.

10. The computer of claim 9, wherein the instructions include further instructions to lock to a carrier from the updated carrier list.

11. The method of claim 1, further comprising updating a stored carrier list with carrier data output from the machine learning system.

12. The method of claim 11, further comprising locking to a carrier from the updated carrier list.

13. A method, comprising:
input a frequency spectrum distribution to a machine learning program to obtain carrier data, including a symbol rate and a center frequency, and output the obtained carrier data from the machine learning program,
wherein the machine learning program is trained with a plurality of frequency spectrum distributions of a wireless satellite communication signal and metadata specifying one or more satellite communication carriers for respective ones of the frequency spectrum distributions, wherein the metadata for each satellite communication carrier includes a respective center frequency and a respective symbol rate.

14. The method of claim 13, wherein respective frequency spectrum distributions are a result of a frequency spectrum analysis of the received wireless satellite communication.

15. The method of claim 14, wherein the frequency spectrum analysis includes performing a Fourier Transform.

16. The method of claim 13, further comprising determining training data for the machine learning program based on user input specifying one or more satellite carriers for each of the one or more frequency spectrum distributions.

17. The method of claim 16, wherein the one or more frequency spectrum distributions are results of simulation or measurement of satellite signal.

18. The method of claim 13, wherein the carrier data further includes a confidence measure for each identified carrier.

19. The method of claim 13, further comprising determining that the machine learning program is trained upon determining that a detection accuracy of the machine learning program exceeds a threshold.

20. The method of claim 13, wherein the machine learning program is a convolutional neural network including a dense layer and a flatten layer.

* * * * *